United States Patent
Ji

(10) Patent No.: US 8,640,745 B2
(45) Date of Patent: Feb. 4, 2014

(54) TIRE REPAIR DEVICE CONTAINING TIRE CEMENT

(75) Inventor: Hui Long Ji, Dongguan (CN)

(73) Assignee: Top Alliance Technology Limited, Tortola (VG)

( * ) Notice: Subject to any disclaimer, the term of this patent is extended or adjusted under 35 U.S.C. 154(b) by 0 days.

(21) Appl. No.: 13/435,660

(22) Filed: Mar. 30, 2012

(65) Prior Publication Data

US 2013/0068346 A1 Mar. 21, 2013

(30) Foreign Application Priority Data

Sep. 21, 2011 (CN) ...................... 2011 2 0355675 U
Sep. 21, 2011 (HK) ................................ 11109963.1

(51) Int. Cl.
*B65B 31/00* (2006.01)
(52) U.S. Cl.
USPC ............. 141/38; 141/105; 141/114; 141/313; 81/15.6
(58) Field of Classification Search
USPC ............. 141/38, 67, 100, 105, 114, 231, 313, 141/329, 330; 152/502, 415; 81/15.6
See application file for complete search history.

(56) References Cited

U.S. PATENT DOCUMENTS

2010/0186849 A1* 7/2010 Yoshida et al. ................. 141/38

* cited by examiner

*Primary Examiner* — Jason K Niesz
(74) *Attorney, Agent, or Firm* — Raymond R. Ferrera; Adams and Reese LLP

(57) ABSTRACT

A tire repair device comprises: a bottle body 10 containing tire cement, and a bottle cap 20 formed at an opening of the bottle body 10. A tire cement guiding tube is provided in the bottle cap 20, in which the guiding tube includes a first tube section 21 axially parallel to the bottle body 10 and a second tube section 22 perpendicular to the first section 21 of the tube. The second tube section 22 connects with an end of a fluid transfer tube 30, and a connector 40 is formed at the other end of the fluid transfer tube 30, and the connector is connected to a tire to deliver tire cement from the bottle body 10 to damaged areas of the tire. A step 25 is formed along the inside wall between an entrance 211 of the first tube section 21 and an entrance 221 of the second tube section 22. A rubber plug 24 is provided between the step 25 and the entrance 211 of the first tube section 21; and the connecting point of the second tube section 22 and the first tube section 21 is located between the step 25 and the end 212 of the first tube section 21.

8 Claims, 4 Drawing Sheets

TIRE REPAIR DEVICE CONTAINING TIRE CEMENT

CROSS-REFERENCE TO RELATED APPLICATIONS

Pursuant to 35 U.S.C. 119(a), the instant application claims priority to prior Hong Kong application number 11109963.1, filed Sep. 21, 2011; and People's Republic of China application number 201120355675.X, filed Sep. 21, 2011.

FIELD OF THE INVENTION

The invention is related to tire repair tools, more specifically, to a type of tire repair device containing tire cement therein for repairing automobiles.

BACKGROUND OF THE INVENTION

Currently, automatic tire repair agents on sale in the market can normally provide preventative functions, including tire repairing and leakage proof. But for a general spray-type tire repair agent, a spray nozzle of a tire repair sprayer can is connected to a gas filling nozzle configured on the tire. When the sprayer is pressed, the tire repair agent can be added into the tire. In operation process, human fingers are required to press the sprayer to make it work. Due to insufficient strength of human fingers in the pressing process, tire repair agents blew into the tire are not enough. In that way, effective tire repairing cannot be obtained. What's more, the sprayer cannot operate when placed in a reversed direction. That is, if the gas filling nozzle is not fitted with the sprayer as normally placed, the tire repairing cannot be achieved.

SUMMARY OF THE INVENTION

The present invention aims to solve at least one of the problems mentioned above, and offer a simple-structured and easy-to-use tire repair device for automobiles.

An embodiment of the invention applies the following solution to solve these technical problems:

A tire repair device containing tire cement for repairing automobile tires is provided. The tire repair device comprises a bottle body for containing tire cement, in which the bottle body comprises a bottle cap formed at an opening of the bottle body. A tire cement guiding tube is provided in the bottle cap. The guiding tube comprises a first tube section axially parallel to the bottle body, and a second tube section perpendicular to the first tube section.

The second tube section is connected with a fluid transfer tube, an end of which is installed with a connector, and the end of the fluid transfer tube is connected with the tire, guiding the tire cement moving from the bottle body to a damaged part of the tire.

A step is formed along the wall between an opening of the first tube section and an opening of the second tube section, and a rubber plug provided between the opening of the first tube section and the step.

A connecting point between the second tube section and the first tube section is located between the step and a bottom end of the first tube section.

For the tire repair device according to the present invention, a through-hole is provided on top of the bottle cap for connecting the bottom end of the first tube section. An internal diameter of the through-hole is smaller than an internal diameter of the first tube section.

For the tire repair device according to the present invention, a first retaining ring is provided at a connecting point between the fluid transfer tube and the second tube section, and a second retaining ring is provided at a connecting point between the fluid transfer tube and the connector.

For the tire repair device according to the present invention, the bottle body is further comprises an air intake hole, which connects with an air compressor to apply compressed air in the bottle body.

For the tire repair device according to the present invention, a sealing gasket is provided between the guiding tube and an interior side wall of the bottle cap to prevent leakages of the tire cement.

For the tire repair device according to the present invention, a necking tube is provided at the opening of the bottle body, and an external thread is formed on the necking tube. The bottle cap further comprises a chamber, an interior wall of which is formed an internal thread configured to couple with the external thread.

The first tube section inserted in the chamber and the sealing gasket is provided between the necking tube and a top surface of the chamber.

The bottom end of the first tube section extends to the top of the chamber, and the second tube section is inserted inside the top of the chamber.

For the tire repair device according to the present invention, the connector comprises a tire valve adapter which connects to the necking tube, a protective case which covers outside the tire valve adapter and connects with a air intake valve of the tire, and a sealing ring which is provided at an end of the tire valve adapter in order to prevent gas and liquid leakages.

For the tire repair device according to the present invention, the tire valve adapter forms a screw connection with an end of the necking tube, and an annular protrusion is provided on an outer surface of the tire valve adapter.

One end of the protective case is fixed on the annular protrusion, and the other end of the protective case comprises a screw thread used to form a connection with the air intake valve of the tire.

The beneficial effects of the invention comprises: by using the bottle cap with the guiding tube and providing the step and the rubber plug inside the first tube section, the rubber plug is able to move inside the first tube section according to different internal pressures in the bottle body, thus blocking or unblocking an tire cement outlet in the bottle body. When compressed air is not applied into the bottle body, the rubber plug is located between the step and the opening of the first tube section. When the air in the bottle body expands, the rubber plug moves to the step. When compressed air is applied in the bottle body, the rubber plug moves to a position between the bottom end of the first tube section and the connecting point between the first and the second tube sections, in order that the tire cement can flow from the bottle body to the damaged area of the tire via the fluid transfer tube. In this way, supply of tire cement to the damaged area of the tire is achieved by changing the pressures in the bottle body. Furthermore, the tire repair device according to the present disclosure has simple structure, is easy to operate, is saving time and effort in either upright or inverted usage, and is good for promotion and implementation.

BRIEF DESCRIPTION OF THE DRAWINGS

The present invention is described in detail with reference to the following figures.

DETAILED DESCRIPTION OF THE EMBODIMENTS

Figure 1:
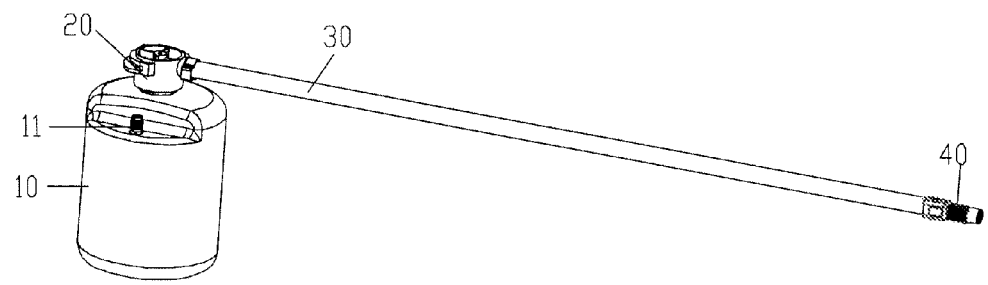
FIG. 1 is a schematic diagram of an overall structure of a tire repair device in accordance with one embodiment of the present invention.

Reference will be made in detail to embodiments of the present disclosure. The embodiments described herein are explanatory, illustrative, and used to generally understand the present disclosure. The embodiments shall not be construed to limit the present disclosure. The same or similar elements and the elements having same or similar functions are denoted by like reference numerals throughout the descriptions.

A schematic diagram of the structure of a tire repair device in accordance with one preferred embodiment of the present invention is shown in FIG. 1, with more details in FIGS. 2-9. The tire repair device comprises a bottle body 10 for containing tire cement. A bottle cap 20 is formed at an opening of the bottle body 10, and a tire cement guiding tube is provided in the bottle cap 20. The guiding tube includes a first tube section 21 axially parallel to the bottle body 10, and a second tube section 22 which is inserted perpendicularly to the first tube section 21. An end 222 of the second tube section 22 connects with a fluid transfer tube 30, and a connector 40 is provided at the other end of the fluid transfer tube 30. The connector 40 is connected with a tire to be repaired, to deliver the tire cement in the bottle body 10 to damaged areas of the tire. A step 25 is provided along an inside wall of the first tube section in a location between an entrance 211 of the first tube section 21 and an entrance 221 of the second tube section 22. A rubber plug 24 is provided between the step 25 and the entrance 211 of the first tube section 21. The rubber plug 24 is tightly attached with the inside wall of the first tube section 21, and a connecting point of the second tube section 22 and the first tube section 21 is located between the step 25 and the bottom end 212 of the first tube section 21.

Figure 6:
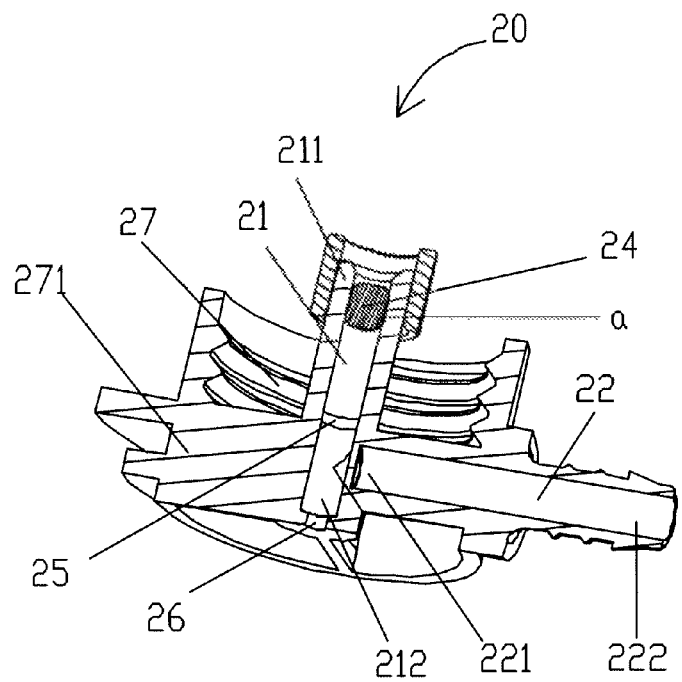
FIG. 6 is a schematic diagram of a tire repair device in accordance with one embodiment of the present invention, in which a rubber plug moves to a location (a) in the bottle cap at normal pressure and temperature.

The rubber plug 24 can move inside the first tube section 21 according to different internal pressures in the bottle body 10, thus blocking or unblocking a tire cement outlet valve. As shown in FIG. 6, under ambient temperature and pressure, without compressed air in the bottle body 10, the rubber plug 24 is located between the step 25 and the entrance 211 of the first tube section 21, namely position a.

Figure 2:
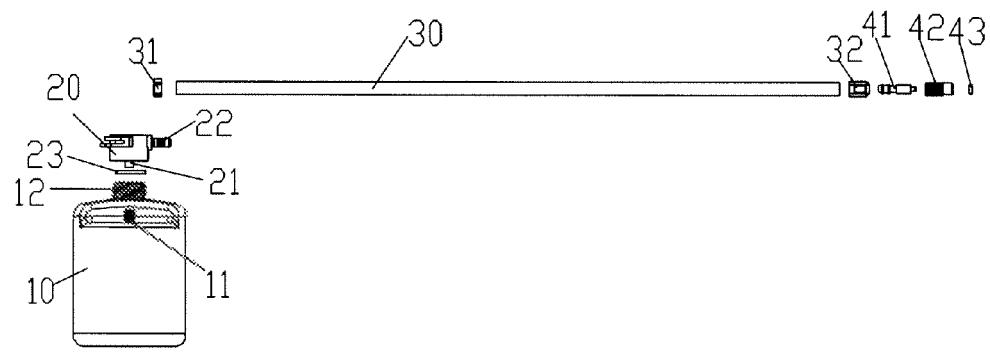
FIG. 2 is a schematic diagram of an assembled structure of a tire repair device in accordance with one embodiment of the present invention.

As shown in FIG. 2, in a condition of high temperature, a pressure caused by air expansion inside the bottle body 10 makes the rubber plug 24 move downward and stop at the step 25. When compressed air is applied inside the bottle body 10, the pressure increases rapidly, and the rubber plug 24 moves to a position between the bottom end 212 of the first tube section 21 and the connecting point of the second tube section 22 and the first tube section 21, in order that tire cement can flow from the bottle body 10 via the fluid transfer tube 30 to damaged areas of the tire, forming a one-way valve working process. In this way, the supply of tire cement to damaged areas of the tire is achieved by changing pressures in the bottle body 10, as tire repairing. Furthermore, the tire repair device according to the present invention has simple structure, is easy to operate, is saving time and effort in either upright or inverted usage, and is good for promotion and implementation.

Figure 4:
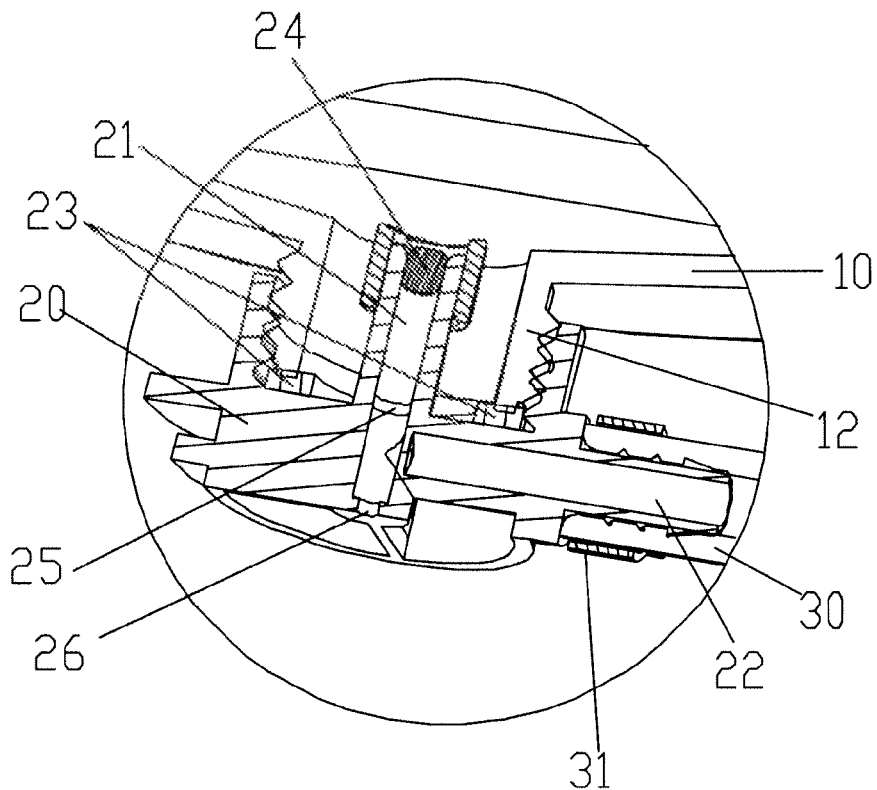
FIG. 4 is an enlarged schematic diagram of part A in FIG. 3.
Figure 8:
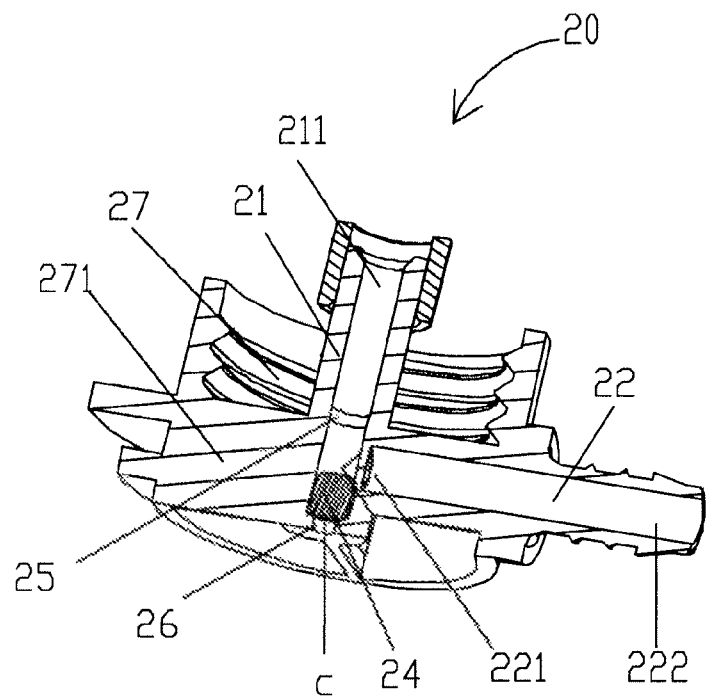
FIG. 8 is a schematic diagram of a tire repair device in accordance with one embodiment of the present invention, in which a rubber plug moves to a location (c) in the bottle cap when compressed air is applied in the bottle body.

In a further embodiment of the present invention, as shown in FIG. 4, a through-hole 26 connecting with the bottom end 212 of the first tube section 21 is provided on top of the bottle cap 20. A inner diameter of the through-hole 26 is smaller than a inner diameter of the first tube section 21. When the rubber plug 24 moves to a position between the bottom end 212 of the first tube section 21 and the connecting point of the first tube section 21 and the second tube section 22 (as shown in FIG. 8, position c), part of compressed air is removed, thus the tire cements cannot completely flow out of the bottle body 10, or the outlet valve can be blocked.

In a further embodiment of the present invention, as shown in FIG. 2, a first retaining ring 31 is provided at a connecting point of the fluid transfer tube 30 and the second tube section 22, to fasten the first tube section 21 and the fluid transfer tube 30 and to avoid leakages of gas and fluid in the tire repairing process. A second retaining ring 32 is provided at a connecting point of the fluid transfer tube 30 and the connector 40, avoiding leakages of gas and fluid for the same purpose. The first retaining ring 31 and the second retaining ring 32 can be hoop structures whose tightness can be adjusted by a screw.

Furthermore, as shown in FIG. 1 and FIG. 2, an air intake hole 11 is formed on the bottle body 10 to connect with an air compressor and apply compressed air into the bottle body 10. Preferably, the air intake hole 11 is set up near the opening of the bottle body 10 for the convenience of connecting the bottle body 10 to the air compressor (not shown in figure).

Figure 3:
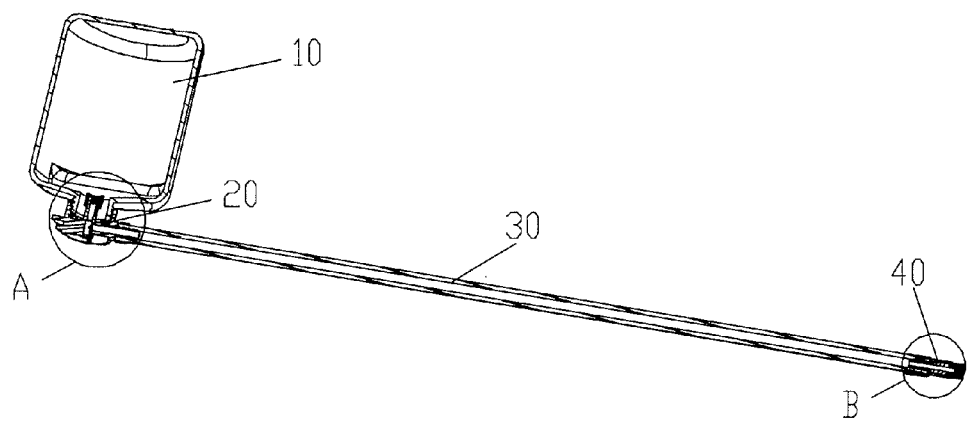
FIG. 3 is an overall cross sectional view of a tire repair device in accordance with one embodiment of the present invention.

In a further embodiment of the present invention, as shown in FIGS. 3 and 4, a sealing gasket 23 is provided between the first tube section 21 and the inner wall of the bottle cap 20, thus preventing the tire cement flowing outside through connecting gaps between the bottle body 10 and the bottle cap 20.

Figure 9:
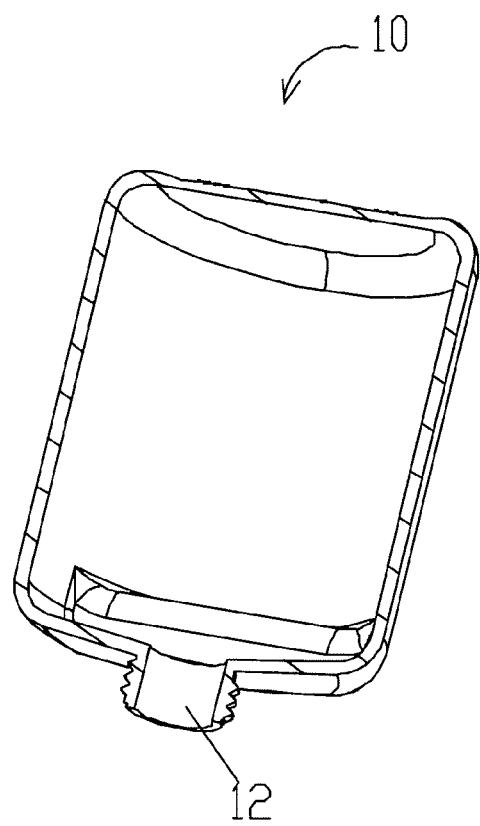
FIG. 9 is a cross sectional view of a bottle body of a tire repair device in accordance with one embodiment of the present invention.

Specifically, as shown in FIGS. 4, 6 and 9, a necking tube 12 is provided at the opening of the bottle body 10, and an external thread is provided along the necking tube 12. Additionally, the bottle cap 20 comprises a chamber 27, and an internal thread is applied in an inner wall of the chamber 27 to match with the external thread. The first section tube 21 of the tube is inserted inside the chamber 27, and the sealing gasket 23 is inserted between the necking tube 12 and the top surface of the chamber 27, further the sealing gasket 24 is pressed tightly with an end of the necking tube 12. The end 212 of the first tube section 21 extends to a top 271 of the chamber 27, and also connects with the through-hole 26 on the top 271 of the chamber 27. The second tube section 22 of is embedded inside the top 271 of the chamber 27. The top surface and top 271 described above indicate corresponding parts of top areas connecting between the chamber 27 and bottle cap 20.

Figure 7:
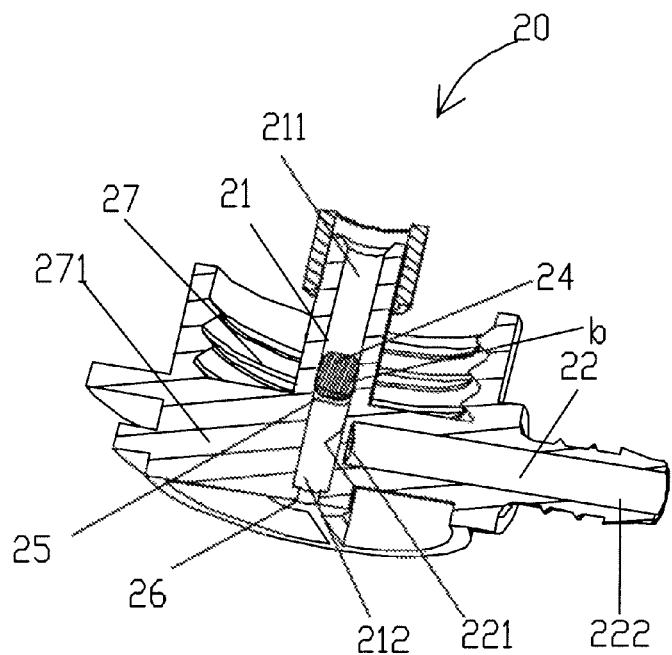
FIG. 7 is a schematic diagram of a tire repair device in accordance with one embodiment of the present invention, in which a rubber plug moves to a location (b) in the bottle cap when heated.

Preferably, as shown in FIGS. 6, 7 and 8, the bottle cap 20 is an integrated element. During the assembling process, it only requires that the bottle cap 20 is wrenched tightly at the necking tube 12 of the bottle body 10, the sealing gasket 23 is installed, and then the fluid transfer tube 30 is tightly locked at the end 222 of the second tube section 22.

Figure 5:
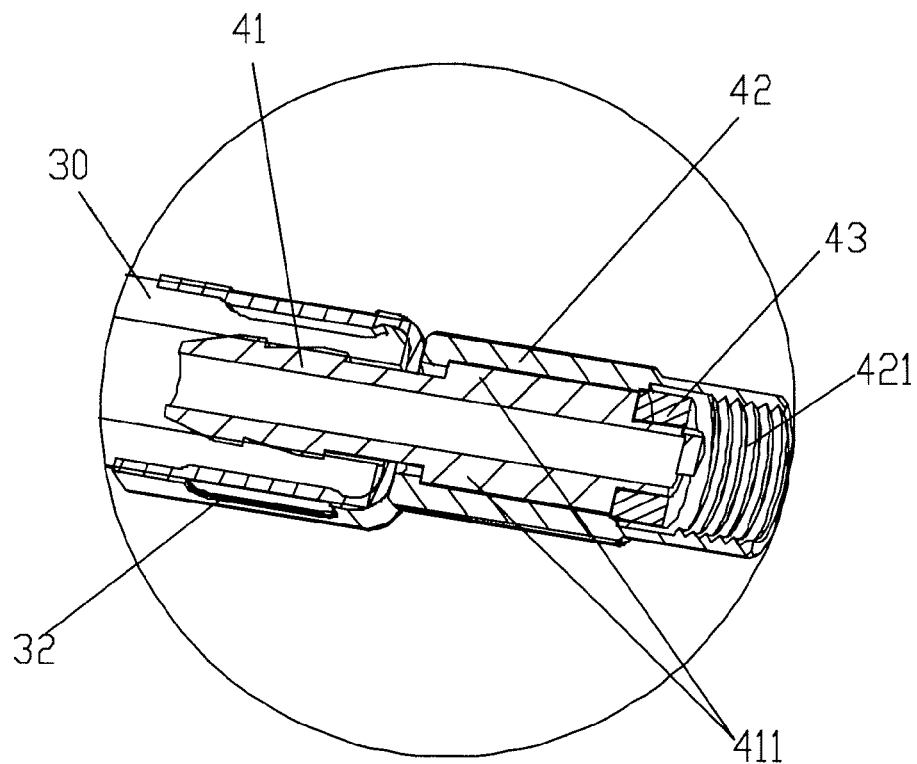
FIG. 5 is an enlarged schematic diagram of part B in FIG. 3.

In a further embodiment of the present invention, as shown in FIGS. 2 and 5, the connector 40 comprises a tire valve adapter 41 which connects with the necking tube 30, and the tire valve adapter 41 can remove a block in the air intake valve of the tire, making the air in the tire, the necking tube 30, the bottle cap 20 and the bottle body 10 a connected system, for the convenience of tire repairing by the tire repair device. The connector 40 also comprises a protective case 42, which covers outside the tire valve adapter 41 and connects with the air intake valve, and a seal ring 43 which is provided at an end of the tire valve adapter 41 and prevents gas and liquid from leaking outside.

Specifically, as shown in FIG. 5, the tire valve adapter 41 forms a screw connection with the end of the necking tube 30, and an annular protrusion 411 is formed on an outer surface of the tire valve adapter 41. One end of the protective case 42 is fixed on the annular protrusion 411, and the other end of the protective case 42 is formed with a screw thread 421 which connects the air intake valve of the tire.

In the above embodiments of the present invention, preferred volume for the bottle body 10 is about 450 ml, which is suitable for mid-size sedan or smaller types. The rubber plug 24 in the bottle cap 20 is formed by rubber materials, which can satisfy the air expansion inside the bottle body at a temperature range of about −30~70° C.

During the repairing process, the air compressor is connected with the bottle body 10 and the bottle body 10 is connected with the tire to be repaired respectively in accordance with the above embodiments of the present invention. When the air compressor is started, the compressed air generated by the air compressor pushes the rubber plug 24 in the bottle body 10 from position a or position b to position c, the tire cement in the bottle body 10 flows into the tire. The air compressor keeps generating compressed air, making the pressure in the tire reach to a standard air pressure, and then via slow forward motion of the car, the tire cement is covering the inner wall of the tire to repair the damaged tire. The tire cement device according to the present disclosure has simple structure, is easy to operate, is saving time and effort in either upright or inverted usage, and is good for promotion and implementation.

Although explanatory embodiments have been shown and described, it would be appreciated by those skilled in the art that changes, alternatives, and modifications all falling into the scope of the claims and their equivalents may be made in the embodiments without departing from spirit and principles of the present disclosure.

The invention claimed is:

1. A tire repair device comprising: a bottle body 10 containing tire cement, and a bottle cap 20 formed at an opening of the bottle body 10; a tire cement guiding tube is provided in the bottle cap 20, in which the guiding tube includes a first tube section 21 axially parallel to the bottle body 10 and a second tube section 22 perpendicular to the first section 21 of the tube; the second tube section 22 connects with an end of a fluid transfer tube 30, and a connector 40 is formed at the other end of the fluid transfer tube 30, and the connector is connected to a tire to deliver tire cement from the bottle body 10 to damaged areas of the tire; a step 25 is formed along an inside wall of the first tube section 21 between an entrance 211 of the first tube section 21 and an entrance 221 of the second tube section 22; and a rubber plug 24 is provided between the step 25 and the entrance 211 of the first tube section 21; and the connecting point of the second tube section 22 and the first tube section 21 is located between the step 25 and the end 212 of the first tube section 21.

2. The tire repair device according to claim 1, wherein a through-hole 26 connecting an end of the first tube section 21 is provided on top of the bottle cap 26; and an inner diameter of the through-hole 26 is smaller than an inner diameter of the first tube section 21.

3. The tire repair device according to claim 1, wherein a first retaining ring 31 is provided at the connecting point of the fluid transfer tube 30 and the second tube section 22; and a second retaining ring 32 is provided at the connecting point of the fluid transfer tube 30 and the connector 40.

4. The tire repair device according to claim 1, wherein an air intake hole 11 is provided on the bottle body 10; the air intake hole 11 connects with an air compressor in order to apply compressed air into the bottle body 10.

5. The tire repair device according to claim 1, wherein a sealing gasket 23 is formed between the guiding tube and the inner wall of the bottle cap 20 to prevent the tire cement from leaking outside.

6. The tire repair device according to claim 5, wherein a necking tube 12 is formed at the opening of the bottle body 10, and an external thread is formed along the necking tube 12; the bottle cap 20 further comprises a chamber 27, and an internal thread is formed at the inner wall of the chamber 27 to match with the external thread; the first tube section 21 is inserted inside the chamber 27, and the sealing gasket 23 inserted between the necking tube 12 and a top surface of the chamber 27; and the end 212 of the first tube section 21 extends to the top 271 of the chamber 27, and the second tube section 22 is embedded inside the top 271 of the chamber 27.

7. The tire repair device according to claim 5, wherein the connector 40 comprises a tire valve adapter 41 which connects to the necking tube 30, a protective case 42 which covers outside the tire valve adapter 41 and connects with the a air intake valve of the tire, and a seal ring 43 which is provided at an end of the tire valve adapter 41, preventing gas and liquid from leaking outside.

8. The tire repair device according to claim 7, wherein the tire valve adapter 41 is connected to a screw thread in an end of the fluid transfer tube 30, and an annular protrusion 411 is formed on the outer surface of the tire valve adapter 41; one end of the protective case 42 is fixed on the annular protrusion 411, and the other end is formed with screw thread 421 which connects the air intake valve of the tire.

* * * * *